United States Patent
Adsera Bertran

(10) Patent No.: US 8,082,240 B2
(45) Date of Patent: Dec. 20, 2011

(54) SYSTEM FOR RETRIEVING INFORMATION UNITS

(75) Inventor: Antonio Adsera Bertran, Tarragona (ES)

(73) Assignee: Classe QSL, S.L., Tarragona (ES)

( * ) Notice: Subject to any disclaimer, the term of this patent is extended or adjusted under 35 U.S.C. 154(b) by 377 days.

(21) Appl. No.: 12/525,047

(22) PCT Filed: Feb. 18, 2008

(86) PCT No.: PCT/ES2008/000086
§ 371 (c)(1),
(2), (4) Date: Jul. 29, 2009

(87) PCT Pub. No.: WO2008/104621
PCT Pub. Date: Sep. 4, 2008

(65) Prior Publication Data
US 2010/0121832 A1    May 13, 2010

(30) Foreign Application Priority Data
Feb. 28, 2007    (ES) .................................. 200700525

(51) Int. Cl.
*G06F 7/00* (2006.01)
*G06F 17/30* (2006.01)

(52) U.S. Cl. ......... 707/706; 707/722; 707/778; 707/956

(58) Field of Classification Search .................. 707/706, 707/707, 708, 722, 728, 778, 956
See application file for complete search history.

(56) References Cited

U.S. PATENT DOCUMENTS

| 5,924,087 | A * | 7/1999 | Takahashi et al. ..................... 1/1 |
| 6,226,638 | B1 * | 5/2001 | Okura et al. .......................... 1/1 |
| 6,286,002 | B1 | 9/2001 | Axaopoulos |
| 6,377,945 | B1 | 4/2002 | Risvik |
| 6,408,266 | B1 * | 6/2002 | Oon ................................. 704/1 |
| 6,684,221 | B1 * | 1/2004 | Rejndrup ............................. 1/1 |
| 6,751,605 | B2 * | 6/2004 | Gunji et al. .......................... 1/1 |
| 7,103,592 | B2 | 9/2006 | Huret |

(Continued)

FOREIGN PATENT DOCUMENTS
EP    0328831 B1    1/1994
(Continued)

OTHER PUBLICATIONS

International Search Report issued Dec. 5, 2008 in corresponding EP 08380045.

(Continued)

*Primary Examiner* — Don Wong
*Assistant Examiner* — Merilyn Nguyen
(74) *Attorney, Agent, or Firm* — Buchanan Ingersoll & Rooney

(57) ABSTRACT

A system for retrieving information units from a data structure. The system includes a search engine and an on-screen user interface. The data structure includes a dictionary file having keywords related to each other by a hierarchy, wherein each information unit is associated with a keyword. The user interface provides a text input zone to define a search and a user control to order the search engine to perform the search depending on the contents of the text input zone. The user interface also provides a first on-screen list display zone for showing results of the search performed by the search engine and a second list display zone for showing the results from the hierarchy related to the results shown in the first display zone.

12 Claims, 4 Drawing Sheets

U.S. PATENT DOCUMENTS

| | | | |
|---|---|---|---|
| 7,296,229 B2 * | 11/2007 | Berstis | 715/259 |
| 7,860,855 B2 * | 12/2010 | Hussami | 707/708 |
| 2003/0110158 A1 | 6/2003 | Seals | |
| 2004/0006460 A1 * | 1/2004 | Katayama et al. | 704/10 |
| 2004/0083206 A1 | 4/2004 | Wu et al. | |

FOREIGN PATENT DOCUMENTS

| | | |
|---|---|---|
| EP | 0922260 B1 | 1/2003 |
| EP | 1193625 B1 | 9/2006 |
| ES | 2 173 752 T3 | 10/2002 |
| WO | WO 2005/098669 A1 | 10/2005 |
| WO | WO 2006/125271 A | 11/2006 |

OTHER PUBLICATIONS

International Search Report issued Jul. 30, 2008 in corresponding PCT/ES 2008/000086.

"Branching Out: The MeSH Vocabulary, Video Transcript" http://www.nlm.nih.gov/bsd/disted/video/transcript.html and http://web.archive.org/web/20061215062441/http://www.nlm.nih.gov/bsd/disted/video/transcript.html.

* cited by examiner

SYSTEM FOR RETRIEVING INFORMATION UNITS

TECHNICAL FIELD

The present invention relates to electronic data processing.

More particularly, the present invention relates to searching for information, or search engines. In addition, the present invention relates to interfaces for interacting with the user of said engines and to database structures for this purpose.

BACKGROUND

Information retrieval is becoming a major technical problem, in that the amount of information available makes it difficult to locate the information sought and increases the man-hour costs of the user performing a search. In addition, a larger amount of information requires greater specialisation and subject knowledge from the user performing the search. Consequently, the sector is looking for new techniques so that searches meet the needs of users and facilitate their work. European patents EP1193625B1, EP0922260B1 and ES2173752 refer to processes, systems and devices for information search. Since the object is to reduce the number of man-hours required to find the information sought, interfaces are an important and integral part of said systems, collaborating in the technical task of facilitating the search. Patent EP0328831B discloses interface elements similar to some of those used in the present invention.

General search engines, such as Google, Yahoo!, etc. attach more importance to the volume of information located than to the accuracy thereof. Consequently, huge amounts of operator time are often required to check information units until an information unit is found that meets the needs of the operator. Depending on the characteristics of the search engine, said engines comprise a user interface having a text input zone (usually known as a "text box") which corresponds to a search request, a command that can be operated (usually known as a "button") to start the search and a list display zone ("list box") to show the results.

Because of the high level of imprecision of said search engines, they have a separate advanced search interface, which allows the user to add extra restrictions to the search criterion input in the text box, such as AND, OR relations between search character strings, the language of the information unit, field, etc. However, these interfaces and associated processes are not capable of effectively solving the problem of precision and complicate the task of the user, in that any additional restriction involves a new user command, which he must complete and/or operate.

To solve the above-mentioned problem of precision, the use of a dictionary is known. A dictionary is a data structure containing words or phrases known as keywords or categories, each information unit being associated with a keyword. In this case, the search is made initially using manual (user) means on keywords, each keyword giving access to the information units associated with said keyword.

The keywords may comprise character sequences of more than one word.

At a more advanced level, it is known that dictionaries may have a strict hierarchical organisation, in other words, the search engine includes a navigator, such that each "parent" category or keyword gives access to "child" sub-categories or keywords. In other words, the search process comprises a navigation phase in a data structure with a strict data hierarchy.

At interface level, basically, search engines that use dictionaries of a known type also have at least one text box for inputting the search criteria, a list box for showing a list of available keywords and, if necessary, a user-operated command.

SUMMARY

An object of the present invention is to disclose a system for setting up an information search from which information can be located with much more precision than is possible with the technology known at present, such that the speed and precision of the search are increased and, hence, productivity.

For the purposes of the present invention, the information or data sought may consist of any information unit that can be stored in an electronic database and that can be located by means of keywords associated with information units, such as scientific or technical articles, company documents, web pages, etc., for example.

In particular, the present invention discloses a system for retrieving information units by electronic processing from a data structure comprising information units, of the type that comprises a search engine and on-screen user interface, said data structure comprising a dictionary file that comprises keywords related to each other according to a hierarchy, each information unit being associated with a keyword. The user interface comprises a text input zone for defining a search and a user command for ordering the search engine to perform a search depending on the content of the text input zone, and a first on-screen list display zone to show the results of the search performed by the search engine, characterised in that said dictionary hierarchy is in star form and the interface has a second list display zone, such that in the first display zone the keywords are shown that resulted from the search performed by the search engine in the dictionary, depending on the contents of the text input zone, and the second shows keywords from the hierarchy below the keyword selected from the list shown in the first display zone.

To summarise, the present invention succeeds, by means of an integrated assembly of a text input box/dictionary list box/related subject list box, combined with a star hierarchy for the dictionary, in facilitating and assisting the user to find the most suitable and specific keywords for performing a search. In other words, it provides accuracy. To obtain more precise results, the user need spend less time filtering and selecting the information that relates to what he is really seeking. This means a reduction in user hours searching for information and a consequent economic saving for the company.

Thus, the invention allows the user to save a considerable amount of time and to increase productivity, since it avoids the user having to pass through all the intermediate hierarchical levels to reach a lower level. Finally, it saves time when the user cannot recall from memory what keyword he is seeking.

In a particularly preferred embodiment, the system according to the present invention performs the search for information units only when the user orders it by means of said user command. In other words, dictionary searches can be performed automatically depending on the contents of the text box, but the search for information units is performed only when the appropriate keyword has been located, which increases speed and saves system computing resources.

Consequently, in an even more preferred embodiment, when faced with an information unit search order generated by the user by operating said user command, the system checks that the term contained in the text input zone (text box) coincides with a keyword in the dictionary, and the search engine searches for information units only if the result of the check is positive, in other words, if the search is requested using terms contained in the dictionary. If the text sequence input in the text input zone comprises more than one word, the system preferably extracts the words contained in the text sequence input and performs an information unit search related simultaneously to said keywords. Thus a high-precision search is performed, as it returns only results that comprise all the restrictions input.

Also in a preferred embodiment, the system fills in the text input zone with a keyword when the user selects said keyword in the first or second display zone. In this way, the system automatically performs a search of the dictionary and in the second display zone shows the list of keywords from the hierarchy level below that of the term selected, thus increasing search speed.

Another advantageous characteristic according to the present invention is that it may have an interface with a single text input zone and still allow complex searches with the consequent facility of information handling.

Regarding preferred embodiments of the structure and implementations of the data hierarchy of the present invention, the dictionary may comprise a record table in which each record comprises an identification code field, a field that contains the text corresponding to a keyword and a synonym field that comprises the codes of other records considered synonymous. The star hierarchy can be set up, preferably, by means of a table in which each record comprises an identification field corresponding to a keyword code, for example a numerical code, and a hierarchy field corresponding to a code for a keyword from lower down the hierarchy.

Similarly, and to facilitate searches of the resulting information units produced by the search engine, each information unit is related to a keyword by a variable numerical distance value, such that the numerical value weights the relevance of the information unit relative to the keyword.

In a preferred embodiment, the system comprises a voice capture device and a syntactical and semantic analysis module associated with said voice device.

More preferably, at the output of the syntactical and semantic analysis module, the system comprises a module for abstracting said output of the syntactical and semantic analysis module depending on the content of the star dictionary, the output of the abstraction module being input in said text input zone.

The present invention may also be implemented in the form of a digital data support comprising commands for a computer system that can be programmed according to a system like that described, or may be implemented in the form of an internet access server comprising a link providing access to the system described above.

BRIEF DESCRIPTION OF THE DRAWINGS

For better understanding of the invention, a more detailed explanation of an embodiment of the system according to the present invention is given below, as an example, supported by the accompanying drawings.

DETAILED DESCRIPTION

In an embodiment as example of the present invention, the system comprises a programmable computational system, provided with a display screen, which also comprises a memory device with a database containing the information units to be sought, the programmable system being configured to perform the functions of the system according to the present invention. Said system may comprise a personal computer or a set of computer devices connected to each other by a network. In another embodiment, the system may use an electronic device with dedicated circuitry, provided with a screen, buttons and, for example, a keyboard and/or microphone interface with the user.

The system according to the present invention comprises an interface combined with a search engine and a data structure giving it advantages over what was known previously. As stated earlier, in known systems in which the search engine is assisted by a keyword dictionary, the dictionary structure has a strict hierarchy.

Figure 1:
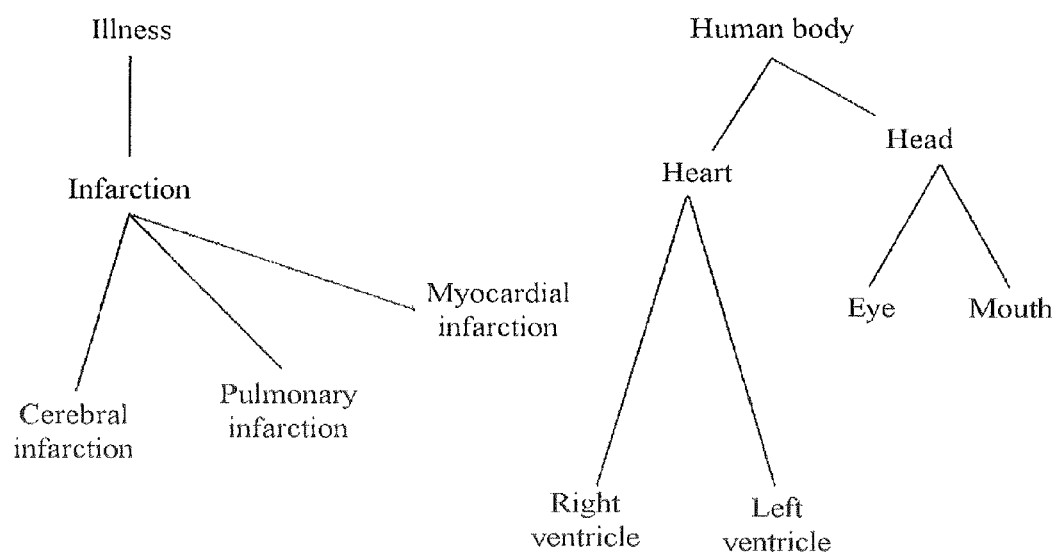
FIG. 1 is a diagram of a strict hierarchical structure between keywords of a dictionary.

FIG. 1 illustrates a strict hierarchy between words in a medical and anatomical dictionary. The strict hierarchy implies that each term or keyword can only have one "parent" term, and so the branches of the tree describing the hierarchy are necessarily of the single-subject type.

Figure 2:
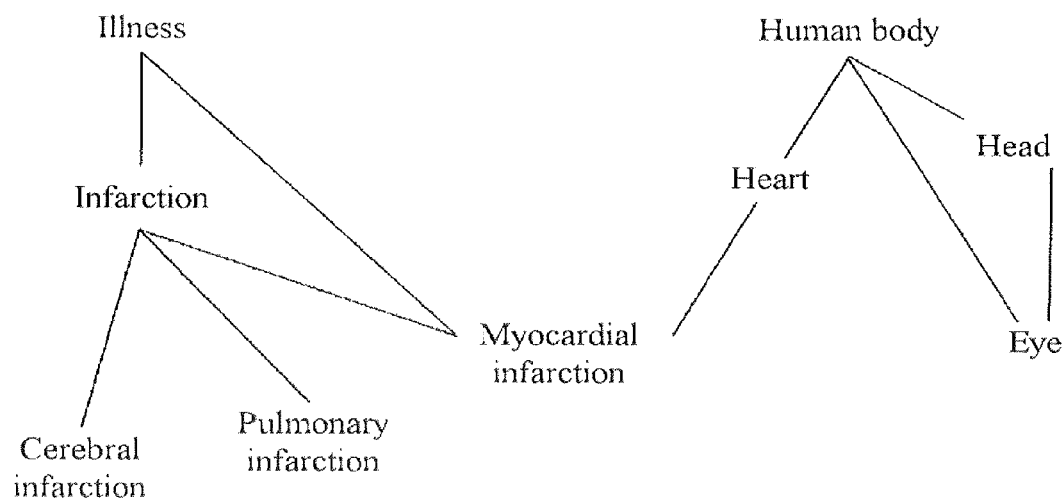
FIG. 2 is a diagram of a star hierarchical structure between keywords of a dictionary.

FIG. 2 illustrates the same terms but structured by a star hierarchy. As can be seen, each term or keyword may have more than one term from the higher level of the hierarchy. This implies two characteristics that differentiate it from a strict hierarchy:

that a keyword may have two terms from separate hierarchies as "parents" (as occurs, for example, with the word "eye" in FIG. 2)

that a keyword may have relations with different branches of a hierarchy (as occurs with the keyword "myocardial infarction" in FIG. 2)

As is explained later, this, in combination with an interface, for example like the one in FIG. 3, allows access to keywords without the need to pass through all levels of a hierarchy, or allows a keyword to be reached from different starting points, which is reflected in much greater speed and precision in the information search, and/or makes it possible to dispense with the memory capacity of the search user.

Figure 3:
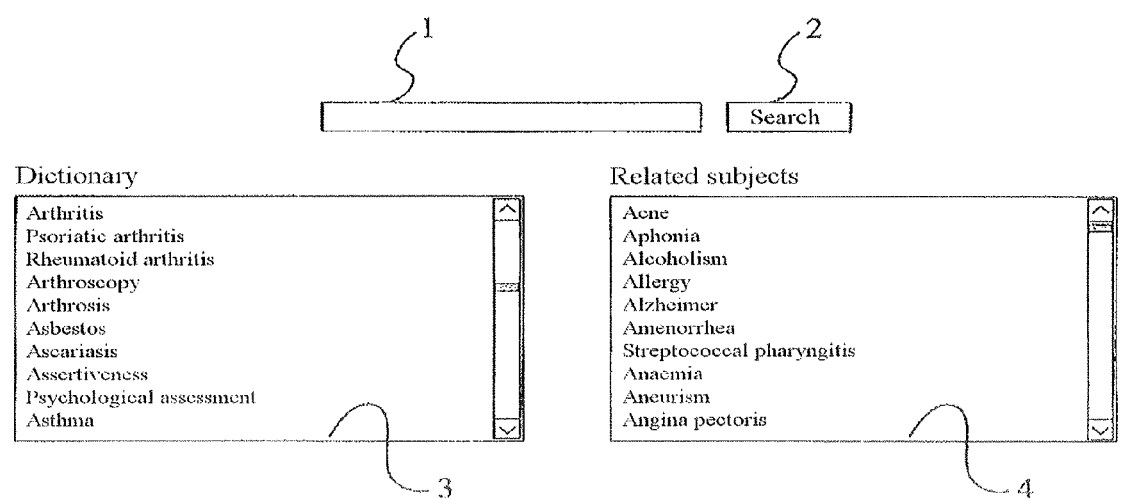
FIG. 3 is a diagram of a possible user interface, in this case a screen interface, belonging to a system according to the present invention.

FIG. 3 shows a screen interface for a system according to the present invention.

A text input zone 1 can be seen in said interface, in this case a text box, a button 2 that can be operated to launch a search for information units (for example, medical or scientific articles) and two list display zones (list boxes) 3 and 4. Operation of the System in the Example.

The user inputs a character string, such as "illness" for example, in the text box 1. The system automatically shows the term input and/or terms adjacent thereto in the first list box 3 according to a proximity criterion (for example, by means of an alphabetic criterion or a distance-related criterion weighted by a numerical value). In particular, the first list box 3 may be a dynamic list, in other words, it has a pointer that changes position as characters are input in the text box 1.

If the string input does not coincide with a keyword, the ambiguity can be resolved at the time using very well known techniques by which the closest or most probable term is shown in the first list box 3.

When the user selects a term from the first list box 3 (for example by clicking or moving a pointer), the system shows the keywords from the dictionary immediately below that of the selected keyword in the hierarchy, in the second list box 4. For example, according to the hierarchical structure in FIG. 2, if the keyword "human body" is selected, the keywords "heart", "head" and "eye" will appear in the second list box 4.

Similarly, if a keyword is selected from either of the list boxes 3, 4, the system fills in the text box 1 with the selected keyword.

If a keyword from the second list box 4 is selected, the system shown in the example automatically fills in the text box 1 with the selected keyword, places the cursor of the first list box 3 at the keyword selected by the user and refreshes the second list box 4 with the "child" keywords, in other words, keywords from lower in the hierarchy than that selected by the user. This possibility, combined with a star hierarchy dictionary structure, gives the system notably improved functionality over that of currently known systems, and provides notably faster access to information.

The system in the example searches for information units from the database only when the user operates the button 2. To improve search precision, the system may have a checker that always checks that the text string input in the text box 1 coincides with a keyword in the dictionary.

Advanced Search

The system in the example may also have an advanced search function using operators, such as "+", "−" in the text box 1, according to known search and text sequence processing techniques.

Nevertheless, if the input sequence is a concatenation of words, the system preferably checks the existence in the keyword dictionary of words input individually as well as all of the word sub-strings input, and the search engine searches for information units (documents) related to the keywords input in the text box.

Similarly, presentation of the results may be influenced by a "distance" between the keyword and the information unit, for example, according to known techniques. To do this, each information unit must be related to at least one keyword by means of a variable numerical distance value.

Data Structure

In an extremely simple version, the dictionary may be a file of records with three fields: a "code" field, for example, numeric, a textual "text" field and a "synonym" field of the same data type as the first item of data and which contains, for each record, the identifiers of other records that are considered synonymous with a keyword. An example is given below:

| Code | Text | Synonym of |
|---|---|---|
| 1 | Feeding | |
| 2 | Nutrition | 1 |
| 3 | Illness | |
| 4 | Infarction | |
| 5 | Myocardial infarction | |
| 6 | Cerebral infarction | 6 |
| 7 | Ictus | |
| 8 | Human body | |
| 9 | Heart | |
| 10 | Head | |
| 11 | Eye | |

The code field allows multilingual systems to be implemented easily by the system.

In addition, the data structure hierarchy can be implemented by means of a table file, such as the one below, reflecting the hierarchy shown in FIG. 2:

| Code | Child code |
|---|---|
| 3 | 4 |
| 3 | 6 |
| 4 | 5 |
| 4 | 6 |
| 8 | 9 |
| 8 | 10 |
| 8 | 11 |
| 9 | 5 |

Using this structure, the system searches the dictionary for the code of the keyword selected in the first list box 3, searches for the relations defined for that code in the hierarchy table and fills in the second list box with the "child" keywords found, easily and quickly and without the need to consume computer resources in searches between information units.

Figure 4:
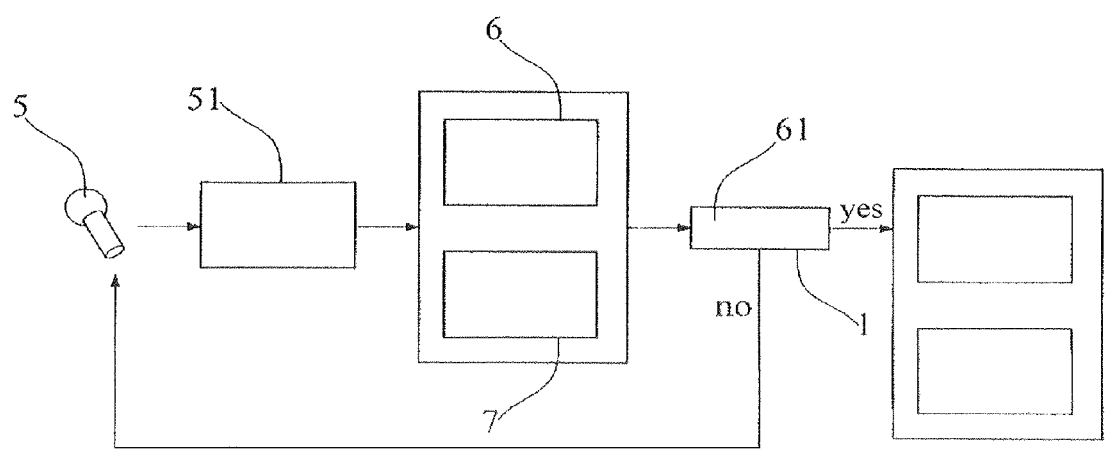
FIG. 4 is a diagram of a possible embodiment of the system according to the present invention, in which the user gives voice instructions, which are analysed and abstracted.

In another preferred embodiment, the operation of which has been shown diagrammatically in FIG. 4, provision has been made for words dictated using a voice capture device, such as a microphone 5, to be input in the text box 1.

In this case, it is particularly preferable for the system to have a syntactical and semantic analysis module 6 (for example, a commercially available module) and an abstraction module 7 based on the star dictionary. The function of the abstraction module 7 consists of transforming the output of the syntactical and semantic module into a text string 61 in the text box 1, which produces a useful search. In practical terms, the abstraction module 7, in a basic embodiment, may be a device for comparing terms produced by the syntactical and semantic analysis module 6 with the terms contained in the star dictionary. In more complex embodiments, the abstraction module 7 may add search commands in the text box 1 depending on the result produced by the syntactical and semantic analysis module 6. In an even more elaborate embodiment, the system may store in memory other search determinants, which may be associated with the text box 1 but may not be visible on the screen, but are nonetheless processed when the user gives the system a search order, for example by pressing the button 2.

Thus, if a user gives verbal instructions, the syntactical/semantic/abstractive analysis 6 should be as sophisticated as possible, such that what is displayed in the text box 1 is not necessarily what the user actually said but rather the result of processing by the system search engine on the star dictionary (which provides a certain level of abstraction) and based on the analysis produced by the syntactical and semantic analysis module 6. For example, a user may say "Search for articles about strengthening the immune system using vitamin C", but the final text box 1 "Vitamin C and the immune system" (since vitamin C and the immune system are terms included in the dictionary). This helps the user obtain documents that match his interests, before starting the document search and wasting computer resources. When the user reads the text string "Vitamin C and the immune system" offered by the system, he must confirm it, for example by pressing the button 2 or giving the "Search" order verbally, so that the system begins to search for the documents, as described above, or he must give an alternative command.

What is claimed is:

1. A computer system, said system comprising:
an electronic processor;
a display device;
a memory device storing a data structure comprised of information units; and
a user interface executed by the processor and displayed on the display device,
wherein:
said data structure comprises a dictionary file having keywords related to each other according to a hierarchy, each of said information units is associated with a keyword, the user interface comprises:
a text input zone for defining a search,
user command for ordering a search engine to perform a search depending on content of the text input zone,
a first list display zone for showing results of the search performed by the search engine, and
a second list display zone for showing results from the hierarchy related to the results shown in the first display zone, and wherein the first list display zone shows keywords that resulted from the search performed by the search engine in a dictionary, depending on contents of the text input zone, and the second list display zone automatically shows keywords from the hierarchy that are lower in said hierarchy than the keyword selected from the list shown in the first list display zone,
wherein the dictionary sets up the hierarchy as a star hierarchy by means of a table in which each record comprises an identification field corresponding to a keyword code and a hierarchy field corresponding to a code for a keyword from lower down the hierarchy.

2. The system according to claim 1, wherein the search for information units is performed only when a user orders a search by means of said user command.

3. The system according to claim 2, wherein, when the user orders a search for information units by operating said user command, the system checks that a term contained in the text input zone coincides with a keyword in the dictionary, and the search engine searches for information units only if the result of the check is positive.

4. The system according to claim 1, wherein the system fills in the text input zone with a keyword when the user selects said keyword in the first or second list display zone.

5. The system according to claim 1, wherein the dictionary comprises a record table in which each record comprises an identification code field, a field that contains text corresponding to a keyword and a synonym field that comprises codes of other records considered synonymous.

6. The system according to claim 1, wherein a single text input element defines the search.

7. The system according to claim 1, wherein, if a text sequence input in the text input zone comprises more than one word, the system evaluates the keywords contained in the text sequence input and performs a search for information units search related simultaneously to said keywords contained therein.

8. The system, according to claim 1, wherein each information unit is related to at least one keyword by means of a variable numerical distance value.

9. The system according to claim 1, comprising:
a voice capture device and
a syntactical and semantic analysis module associated with said voice capture device.

10. The system according to claim 9, comprising, at an output of the syntactical and semantic analysis module, an abstraction module for abstracting said output of the syntactical and semantic analysis module depending on content of the dictionary, the output of the abstraction module being input in said text input zone.

11. A computer-readable storage device storing commands that, when executed by a programmable computer system, cause the computer system to search a database storing a dictionary comprised of keywords related to one another by a hierarchy, said commands controlling the computer system to:
display, on a display device, a user interface executed by the computer system, said user interface comprising a text input zone, a first list display zone, and a second list display zone;
receive in the text input zone, via a user input device, text defining a search;
request a search engine to perform a search of the dictionary based on content of the text input zone;
display, on the display device in said first list display zone, keywords received from the search engine, said keywords being a result of the search performed by the search engine; and
display, on the display device in the second list display zone, other keywords from the hierarchy that are lower in the hierarchy than the keyword selected from the keywords displayed in the first list display zone, wherein the dictionary sets up the hierarchy as a star hierarchy by means of a table in which each record comprises an identification field corresponding to a keyword code and a hierarchy field corresponding to a code for a keyword from lower down the hierarchy.

12. A method for a computer system to search a database that stores a dictionary comprised of keywords having a hierarchical relationship, said method comprising:
displaying, on a display device, a user interface executed by a computer processor, said user interface comprising a text input zone, a first list display zone, and a second list display zone;
receiving in the text input zone, via a user input device, text defining a search;
requesting a search engine to perform a search of a dictionary based on content of the text input zone, said dictionary hierarchy having a star form;
displaying, on the display device in said first list display zone, keywords received from the search engine, said keywords being a result of the search performed by the search engine; and
displaying, on the display device in the second list display zone, other keywords from the hierarchy that are lower in the hierarchy than the keyword selected from the keywords displayed in the first list display zone, wherein the dictionary sets up the hierarchy as a star hierarchy by means of a table in which each record comprises an identification field corresponding to a keyword code and a hierarchy field corresponding to a code for a keyword from lower down the hierarchy.

* * * * *